US008548531B2

(12) United States Patent
Small et al.

(10) Patent No.: US 8,548,531 B2
(45) Date of Patent: *Oct. 1, 2013

(54) METHOD AND SYSTEM OF CREATING CUSTOMIZED RINGTONES

(71) Applicant: AT&T Intellectual Property I, L.P., Atlanta, GA (US)

(72) Inventors: David B. Small, Dublin, CA (US); Nalesh Chandra, Lincoln, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/687,420

(22) Filed: Nov. 28, 2012

(65) Prior Publication Data

US 2013/0090099 A1 Apr. 11, 2013

Related U.S. Application Data

(63) Continuation of application No. 12/470,545, filed on May 22, 2009, now Pat. No. 8,364,210, which is a continuation of application No. 11/294,158, filed on Dec. 5, 2005, now Pat. No. 7,546,148.

(51) Int. Cl.
*H04M 3/00* (2006.01)

(52) U.S. Cl.
USPC ........................ 455/567; 455/414.1

(58) Field of Classification Search
USPC .......... 455/567, 414.1, 414.4, 415, 418–420, 455/412.1–412.2
See application file for complete search history.

(56) References Cited

U.S. PATENT DOCUMENTS

| 6,014,089 | A  | * | 1/2000  | Tracy et al.       | 340/870.02 |
| 7,027,983 | B2 | * | 4/2006  | Puterbaugh et al.  | 704/231    |
| 7,058,429 | B2 |   | 6/2006  | Fujito et al.      |            |
| 7,142,645 | B2 |   | 11/2006 | Lowe               |            |
| 7,277,691 | B1 |   | 10/2007 | Lundy et al.       |            |
| 7,302,253 | B2 |   | 11/2007 | Moody et al.       |            |
| 7,343,179 | B1 |   | 3/2008  | Theis et al.       |            |
| 7,486,971 | B2 | * | 2/2009  | Awada et al.       | 455/567    |
| 7,493,125 | B2 | * | 2/2009  | Nagesh et al.      | 455/456.1  |
| 7,962,129 | B2 | * | 6/2011  | Small et al.       | 455/419    |
| 7,986,977 | B2 |   | 7/2011  | Rosenberg et al.   |            |

(Continued)

FOREIGN PATENT DOCUMENTS

GB 2378100 1/2003

OTHER PUBLICATIONS

<www.myphonefiles.com/software/voicetonesstudio.php> printed date Sep. 14, 2005, 3 pages.

(Continued)

*Primary Examiner* — Pablo Tran
(74) *Attorney, Agent, or Firm* — Hartman & Citrin LLC (57) ABSTRACT

A custom ringtone provisioning device is configured to determine user selectable audio options available for generating a digital audio recording based on ringtone capabilities of a mobile communication device of a user, display the available user selectable audio options for the user to select, generate the digital audio recording using the user selectable audio options selected by the user, and transmit the generated digital audio recording to a server for the server to convert the generated digital audio recording into a customized ringtone for use by the mobile communication device in alerting the user of incoming communications.

20 Claims, 3 Drawing Sheets

(56) References Cited

U.S. PATENT DOCUMENTS

| | | | |
|---|---|---|---|
| 8,064,896 B2* | 11/2011 | Bell et al. ............... 455/422.1 |
| 8,135,114 B2 | 3/2012 | Tsul et al. |
| 2002/0115456 A1* | 8/2002 | Narinen et al. ............ 455/466 |
| 2003/0096605 A1* | 5/2003 | Schlieben et al. ........... 455/419 |
| 2003/0096639 A1 | 5/2003 | Cluff et al. |
| 2003/0109251 A1* | 6/2003 | Fujito et al. ............... 455/414 |
| 2003/0211867 A1* | 11/2003 | Bonnard et al. ............ 455/567 |
| 2003/0219110 A1* | 11/2003 | Tsai et al. ............... 379/373.01 |
| 2004/0139318 A1 | 7/2004 | Fiala et al. |
| 2005/0170865 A1 | 8/2005 | Harvej et al. |
| 2006/0199575 A1* | 9/2006 | Moore et al. ............... 455/418 |
| 2006/0233339 A1 | 10/2006 | Schwartz |
| 2006/0293089 A1* | 12/2006 | Herberger et al. .......... 455/567 |
| 2007/0037605 A1 | 2/2007 | Logan |
| 2007/0123280 A1 | 5/2007 | McGary et al. |
| 2009/0185669 A1 | 7/2009 | Zitnik et al. |

OTHER PUBLICATIONS

<www.tunes4phones.com/ringtone-maker.html> printed Sep. 14, 2005, 1 page.
<www.gizmodo.com/cellphones> printed date Sep. 14, 2005, 2 pages.
<www.ringranger.com/home> printed dated Sep. 14, 2005, 1 page.
<www.mobile-weblog.com/archives/mix_your_own_ringtones.html> printed date Sep. 14, 2005, 2 pages.
U.S. Office Action dated May 8, 2012 in U.S. Appl. No. 12/470,545.
U.S. Notice of Allowance dated Sep. 11, 2012 in U.S. Appl. No. 12/470,545.
U.S. Office Action dated Aug. 19, 2008 in U.S. Appl. No. 11/294,158.
U.S. Office Action dated Jan. 22, 2009 in U.S. Appl. No. 11/294,158.
U.S. Notice of Allowance dated Feb. 25, 2009 in U.S. Appl. No. 11/294,158.

* cited by examiner

METHOD AND SYSTEM OF CREATING CUSTOMIZED RINGTONES

CROSS-REFERENCE TO RELATED APPLICATIONS

This is a continuation of U.S. application Ser. No. 12/470,545, filed May 22, 2009, now U.S. Pat. No. 8,364,210, which is a continuation of U.S. application Ser. No. 11/294,158, filed Dec. 5, 2005, now U.S. Pat. No. 7,546,148, each of which is hereby incorporated by reference in its entirety.

BACKGROUND OF THE DISCLOSURE

1. Field of the Disclosure

The present disclosure relates to methods and systems of creating customized ringtones of the type used with mobile phones to alert a recipient of incoming calls.

2. Background Art

Mobile phones have become a platform for personal expression—with colorful covers and individual ring-tones, they've become a fashion statement as well. As a result, a new market has emerged to fill the need for individualized ringtones. For a few dollars, phone owners can "download" ringtones of favorite songs from a variety of providers. This has created a large, growing market to supply these ringtones.

With the emergence of handsets that can play "polyphonic" ringtones or, better yet, "realistic" ringtones, there is an untapped market opportunity for the complete customization of ringtones. While customers can order their favorite music as a ringtone, even a technically savvy person would have a difficult time doing any of the following:

Creating polyphonic ringtones of specific phrases of music;

Creating ringtones of a less-widely known piece of music;

Modifying the sound characteristics of a phrase of music (e.g., changing the echo, reverb, speed, octave, creating robotic effects, filtering out the voice, reproducing only the percussion, etc.);

Recording their own ringtone.

BRIEF DESCRIPTION OF THE DRAWINGS

The present disclosure, both as to its organization and manner of operation, together with further objects and advantages thereof, may be best understood with reference to the following description, taken in connection with the accompanied drawings in which.

DETAILED DESCRIPTION

The present disclosure discloses an embodiment of a custom ringtone provisioning device which includes an identification element, a user interface, a digital audio generator, and a communication feature. The identification element is configured to determine user selectable audio options available for generating a digital audio recording based on ringtone capabilities of a mobile communication device of a user. The user interface is configured to display the available user selectable audio options for the user to select. The digital audio generator is configured to generate the digital audio recording using the user selectable audio options selected by the user. The communication feature is configured to transmit the generated digital audio recording to a server for the server to convert the generated digital audio recording into a customized ringtone for use by the mobile communication device in alerting the user of incoming communications.

The identification element may be further configured to receive a phone number of the mobile communication device. In this case, the communication feature is further configured to transmit the phone number to the server for the server to use in order to download the customized ringtone to the mobile communication device.

The custom ringtone provisioning device may further include a speaker for playing the generated digital audio recording to the user.

The identification element may be further configured to identify the user. In this case, the identification element is further configured to determine the ringtone capabilities of the mobile communication device as a function of the identified user and/or the digital audio generator is further configured to generate the digital audio recording as a function of the identified user.

The mobile communication device may be a phone such as a cellular phone.

The present disclosure discloses an embodiment of a method which includes determining at a custom ringtone provisioning device user selectable audio options available for generating a digital audio recording based on ringtone capabilities of a mobile communication device of a user. The method further includes displaying at the custom ringtone provisioning device a user interface having the available user selectable audio options for the user to select. The method further includes generating at the custom ringtone provisioning device the digital audio recording using the user selectable audio options selected by the user. The method further includes transmitting the generated digital audio recording from the custom ringtone provisioning device to a server for the server to convert the generated digital audio recording into a customized ringtone for use by the mobile communication device in alerting the user of incoming communications.

The present disclosure discloses another embodiment of a custom ringtone provisioning device which includes an identification element, a user interface, a digital audio generator, and a communication feature. The identification element is configured to identify information associated with a user and to determine user selectable audio options available for generating a digital audio recording based on the information associated with the user. The user interface is configured to display the available user selectable audio options for the user to select. The digital audio generator is configured to generate the digital audio recording using the user selectable audio options selected by the user. The communication feature is configured to transmit the generated digital audio recording to a server for the server to convert the generated digital audio recording into a customized ringtone for use by the mobile communication device in alerting the user of incoming communications. The digital audio generator may be further configured to generate the digital audio recording as a function of the information associated with the user.

Figure 1:
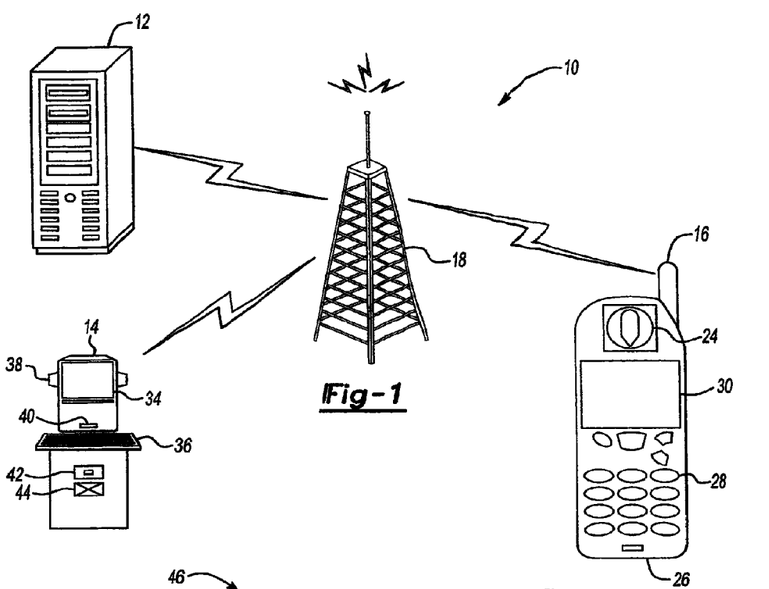
FIG. 1 illustrates a system for generating customized ringtones in accordance with one non-limiting aspect of the present disclosure.

FIG. 1 illustrates a system 10 for generating customized ringtones in accordance with one non-limiting aspect of the present disclosure. System 10 may include a server 12, kiosk 14, and one or more phones 16. A network 18 or other communication element may be included for facilitating communications between the server, kiosk, and phone. Server 12 may be part of a cellular network or other wireline or wireless phone network associated with phone 16.

Phone 16 may be configured to support telephone communications through signaling services provided through network 18, as one having ordinary skill in the art will appreciate. In response to incoming calls or other phone alerts, phone 16 may be configured to playback a ringtone stored in a memory thereof (not shown). Phone 16 may include features, processors, applications, or other elements to facilitate playback of the ringtone.

The ringtone may be a downloadable feature stored on phone 16 to facilitate alerting the user of various operating conditions, such as to incoming calls or other alerts, such as an alarm, message alert, etc. The ringtone may include audio, video, static pictures, and/or some combination thereof, depending on the capabilities of the phone to support various applications and operations. The ringtone may include features for associating itself with elements stored on phone 16, such as to permit playback of an audio only ringtone with corresponding display of a picture separately stored on phone 16.

Phone 16 may include a speaker 24, microphone 26, keypad 28, and display 30 to facilitate the operation thereof and the playback of the ringtone. Speaker 24 may be a typical speaker used for projecting sounds and other audio to a surrounding area. Display 30 may be a mono- or multi-color display configured to display alphanumeric messages and other features, include moving images and video. Optionally, display 30 may be a touch-screen or other feature configured to receive user inputs.

Keypad 28 may include any number of buttons and other user actuatable features for receiving any number of user inputs. Lights and other features may be included to backlight or otherwise illuminate keypad 28 and other portions of the phone, such as in response to user inputs and/or playback of the ringtone. Microphone 26 is a typical microphone configured to communicate audio signals from a user through the phone system. Optionally, the microphone may support recording and storing audio on the phone.

Phone 16 includes any number of other features and options, including other inputs, cards, and interfaces. For example, phone 16 may include an interface, such as a cable jack, USB port, etc., for connecting the phone to a computer or other electronic device. Phone 16 may also include any number of embedded or downloaded applications and programs to facilitate the operation thereof. Optionally, one of the applications may be a user interface application that permits various features and messages to be visualized on display 30 so that user inputs in response thereto may be monitored, such as by coordinating the information displayed in the user interface with user selections of keypad 28 and/or touch-screen.

Kiosk 14 may include a display 34, keypad 36, speaker 38, microphone 40, disc drive 42, input 44, and/or the like to facilitate the operation thereof. Kiosk 14 may be of the type commonly associated with commercial ventures and retail stores. For example, it may be suitable configured to be standalone items for use by customers in shopping centers, malls, and retail stores. It may include processors, memories, and communications features to facilitate any number of operations associated with the present disclosure.

Display 34 may be a mono- or multi-color display configured to display alphanumeric messages and other features, including moving images and video. Optionally, display 34 may be a touch-screen or other feature configured to receive user inputs. Speaker 38 may be a typical speaker used for projecting sounds and other audio to a surrounding area. Keypad 36 may include any number of buttons and other user actuatable features for receiving any number of user inputs. Microphone 40 is a typical microphone configured to record audio signals from a user. Optionally, microphone 40 may support recording and storing audio on kiosk 14.

Disc drive 42 may relate to a compact disc drive, digital video disc (DVD), flash memory, and the like. It may be configured to read signals from any number of mediums and according to any number of protocols, formats, and standards. Input 44 may be to support cards, cable jacks, USB ports, etc., for connecting the kiosk or other electronic devices. Kiosk 14 may also include any number of embedded or downloaded applications and programs to facilitate the operation thereof. Optionally, one of the applications may be a user interface application that permits various features and messages to be visualized on display 34 so that user inputs in response thereto may be monitored, such as by coordinating the information displayed in the user interface with user selections of keypad 36 and/or touch-screen.

The user interface may include features to facilitate recording and synthesizing signals received by kiosk 14 through disc drive 42, input 44, microphone 40, and/or otherwise input thereto, such from a webpage. The synthesizing may include manipulating a sample recording according to any number of characteristics. For example, if the recording is an audio track, the pitch, rhythm, beat, instrument, echo, and/or a sound characteristic may be adjustment/manipulated, (similar to synthesizing options associated with electronic/digital keyboards). Alternatively, if the recording is a video, the color, sound (pitch, rhythm, etc.), length, and other features may be similarly be synthesized.

Figure 2:
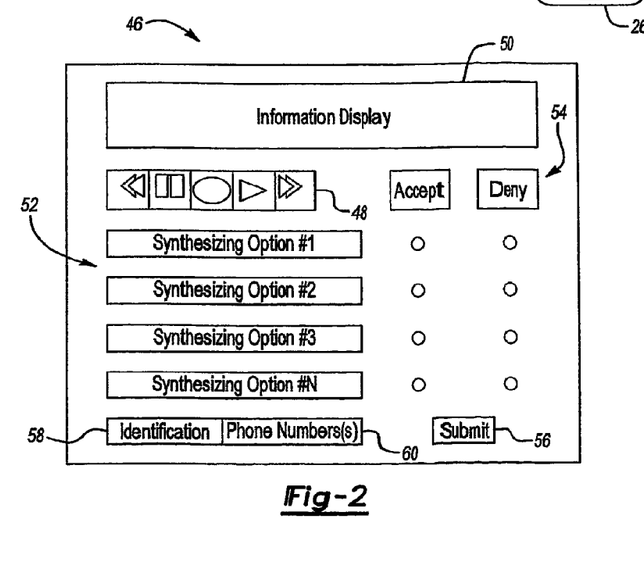
FIG. 2 illustrates a user interface having features to facilitate synthesizing a sample recording in accordance with one non-limiting aspect of the present disclosure.

FIG. 2 illustrates a user interface 46 having features to facilitate synthesizing a sample recording in accordance with one non-limiting aspect of the present disclosure. For exemplary purposes, the synthesizing is described with respect to synthesizing audio tracks, however, the present disclosure is not so limited and fully contemplates synthesizing any form of media suitable for use as and/or with ringtones.

User interface 46 may include a recording feature 48 to facilitate recording the sample recording. For example, an audio disc may be inserted into the disc drive and read by the kiosk. An information display portion 50 of the user interface 46 may then display information relevant to the disc and other information associated with the operation of the kiosk. For example, a name of the disc and tracks included therein may be displayed along with instructions and other information associated with recording a sampling thereof.

Recording feature 48 may include a rewind, pause, record, play, and fast forward button. The buttons may be used to manipulate the recording according the functions associated therewith. For example, if only a portion of a song track is desired, the rewind and fast forward buttons may be used to locate the desired portion and the record button may be used to record a desired length thereof. Once recorded, the sample may be played back by selecting the play button.

A number of synthesizing options 52 may be displayed to facilitate synthesizing the sample recording. The synthesizing options may include audio adjustments, such as pitch (deeper<--->higher), room size (no echo<--->Grand Canyon), tempo (slower<--->faster), rhythm, bass (low frequencies), voice (higher frequencies, generally), instrumentation of melody (piano, trumpet, guitar), voice (robotic, cartoon, deeper/higher voice). Other options may include visual (images/video), such as contrast, brightness, color mapping, colorize or turn to black and white, video speed, artistic effects (such as make it look like stained glass, impressionist painting, a sketch, watercolors, pointillism, etc.). Of course, any number of other options may be included and these are merely exemplary of some of them.

One or more of synthesizing options 52 may be selected by selecting one or more of accept or deny buttons 54 and then selecting submit button 56. Once submitted, the kiosk synthesizes the sample recording according to the selected synthesizing option(s). The user may then select play to play back the synthesized recording. Optionally, the synthesized recording may be discarded and the sample recording re-synthesized through other selections and/or the synthesized recording may be further synthesized with selection of additional synthesizing options. This process can be repeated as desired.

An identification feature 58 may be included to facilitate identifying the kiosk user. For example, if kiosk 14 is located in a shopping mall, it may be advantageous to identify the user and other information associated therewith. This information may then be used to bill the user and/or to determine the user's phone capabilities. Optionally, one or more of the synthesizing options may be determined as a function of the identified user, such as according to subscription options. Kiosk 14 may exchange information with the server and/or another feature to facilitate billing and to determine the available synthesizing options.

A phone feature 60 may be included to facilitate identifying one or more phones intended to receive the customized ringtone made from the synthesized recording, as described below in more detail. Phone feature 60 may be used by the user to input one or more phone numbers, such as the user's phone number and a friend's phone numbers, such that each phone number receives the customized ringtone. Optionally, the phone number(s) may be used by server 12 to identify phones 16 and the operating characteristics associated therewith so as to facilitate converting the synthesized sample to customized ringtone suitable for operation on phones 16.

Server 12 may correspond with any network feature have properties sufficient for communicating with both of kiosk 14 and one or more phones 16. Server 12 may include processors, memories, and the like to facilitate converting synthesized recordings received from kiosk 14 to a customized ringtone suitable for use with phone 16 to alert a recipient of incoming calls or other alerts. Server 12 may communicate with the kiosk and phone through the same or different communication mediums and/or protocols and standards.

Figure 3:
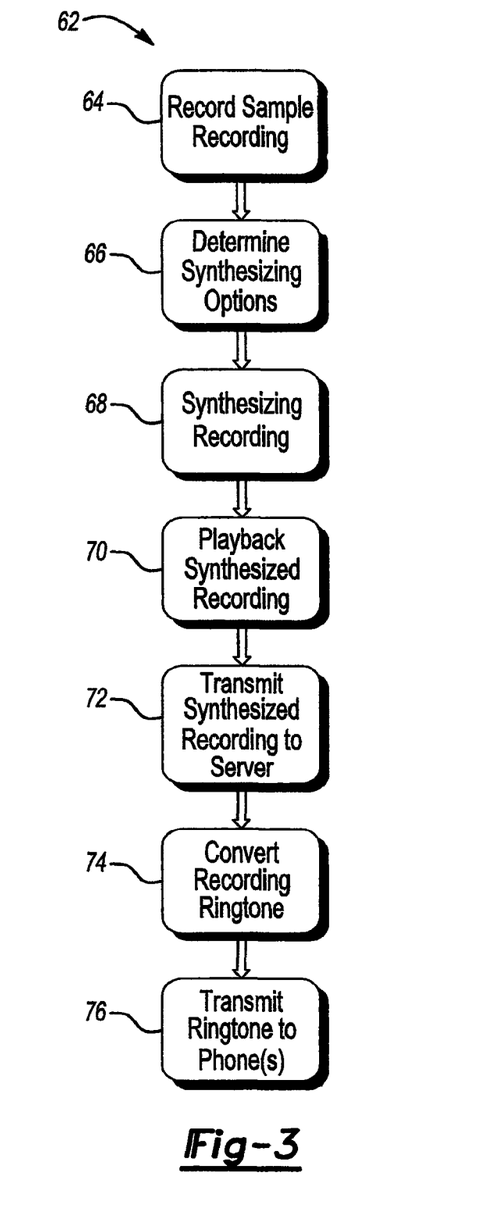
FIG. 3 illustrates a flowchart of a method of customizing ringtones in accordance with one non-limiting aspect of the present disclosure.

FIG. 3 illustrates a flowchart 62 of a method of customizing ringtones in accordance with one non-limiting aspect of the present disclosure. The method generally relates to server 12 or other feature associated with phone network 18 being configured to facilitate generating a customized ringtone based on a synthesized recording received from kiosk 14. The customized ringtone may then be transferred to phone 16 for usage. The method is described with respect to the customized ringtone being generated for use with a mobile phone, however, the method applies to any number of environments and applications where it is desirable to provide a ringtone or similar feature to an electronic device for use in alerting a user of incoming calls or other alerts/messages.

Block 64 relates to determining a sample recording that will comprise at least a portion of the ringtone. The sample recording is recorded by kiosk 14 from media inputted thereto by the user, such as from a disc or flash memory carried by the user. Optionally, kiosk 14 may include network capabilities for downloading media from a network site and recording a portion thereof. User interface 46 provides one or more features to facilitate recording the sample recording. The length of the sample recording may be selected by the user and/or limited as function of phone capabilities associated with the phone intended to receive the customized ringtone.

Block 66 relates to determining synthesizing options available from kiosk 14 to facilitate synthesizing the sample recording. The synthesizing options may relate to ringtone capabilities of phone 16, such as the audio, video, or display capabilities of the phone, its application capabilities or operating system, and other subscription related features, such as limitations imposed on the user by the service provider. For example, the subscribers features may specify the number of ringtones the user is permitted to create, billing procedures associated with generating the ringtone, and/or other features associated with the service provider.

Optionally, kiosk 14 may include an embedded or downloaded user interface application for synthesizing the sample recording according to any number of synthesizing options. The available options may be selected as a function of the user and/or all the options may be available to all users. Information display portion 50 of user interface 46 may explain the various options and/or provide other instructions to facilitate selection and use of the synthesizing options. Server 12 may also be used to limit or otherwise select the synthesizing options, such as if the user has stored a favorite synthesizing pattern or number of options.

Block 68 relates to kiosk 14 synthesizing the sample recording according to the selected synthesizing options. Kiosk 14 may include a separate application or other feature for processing the sample recording and performing the synthesizing thereof. Information display 50 may be used to indicate when synthesizing is complete and to instruct the user to take further action(s).

Block 70 relates to playing back the synthesized sample recording. Recording features 48 may be used to control the playing back through speakers 38. The user listens to the played back synthesized recording to determine whether it is suitable for use as a ringtone. Optionally, the synthesizing steps may be repeated to re-synthesize the sample recording and/or the synthesized recording (block 68). Kiosk 14 may permit temporary and/or permanent storage of each synthesized sample so as to permit the user to play back different version thereof.

Block 72 relates to transmitting one or more of the synthesized recordings to the server 12. Kiosk 14 may package the synthesized recording according to Internet Protocols (IP) for transmission to server 12. The identified user and phone number(s) may be included with the transmission for use by server 12 in identifying the user, such as for billing purposes, and for determining capabilities of the phone(s) to receive the ringtone.

Block 74 relates to the server converting the synthesized recording to a customized ringtone suitable for use with the identified phone(s). This conversion process may include manipulating the synthesized recording from one form a, standard, or protocol to another suitable for use with phone(s) 16. Of course, some phones 16 may have capabilities to use any number of formats, standards, and protocols with the ringtones such that it may be unnecessary to convert the synthesized sample recording in order to create the customized ringtone, i.e., the synthesized sample recoding itself becomes the customized ringtone.

For example, some phones 16 may be unable to playback certain audio files, such that ringtone may be generated to permit playback of the audio for the audio constraints of phone 16. Optionally, if the ringtone is intended for a recipient other than the individual creating it, this step may comprise formatting the sounds to function as a ringtone on the desired recipient's phone. The capabilities and characteristics of phone 16 may be determined to facilitate creation of the ringtone.

Block 76 relates to transferring the customized ringtone from the server to the identified phone(s). This may include transmitting the customized ringtone over phone network 18 of the identified phone(s) 16. The ringtone may be transferred in a message or through a download process such that the user may be requested to accept the downloading thereof and/or the download may occur without notice to the user such that the customized ringtone becomes automatically available to the user. The server may be required to generate different ringtones for the other phones receiving the same ringtone, depending on the capabilities and operating systems thereof.

Figure 4:
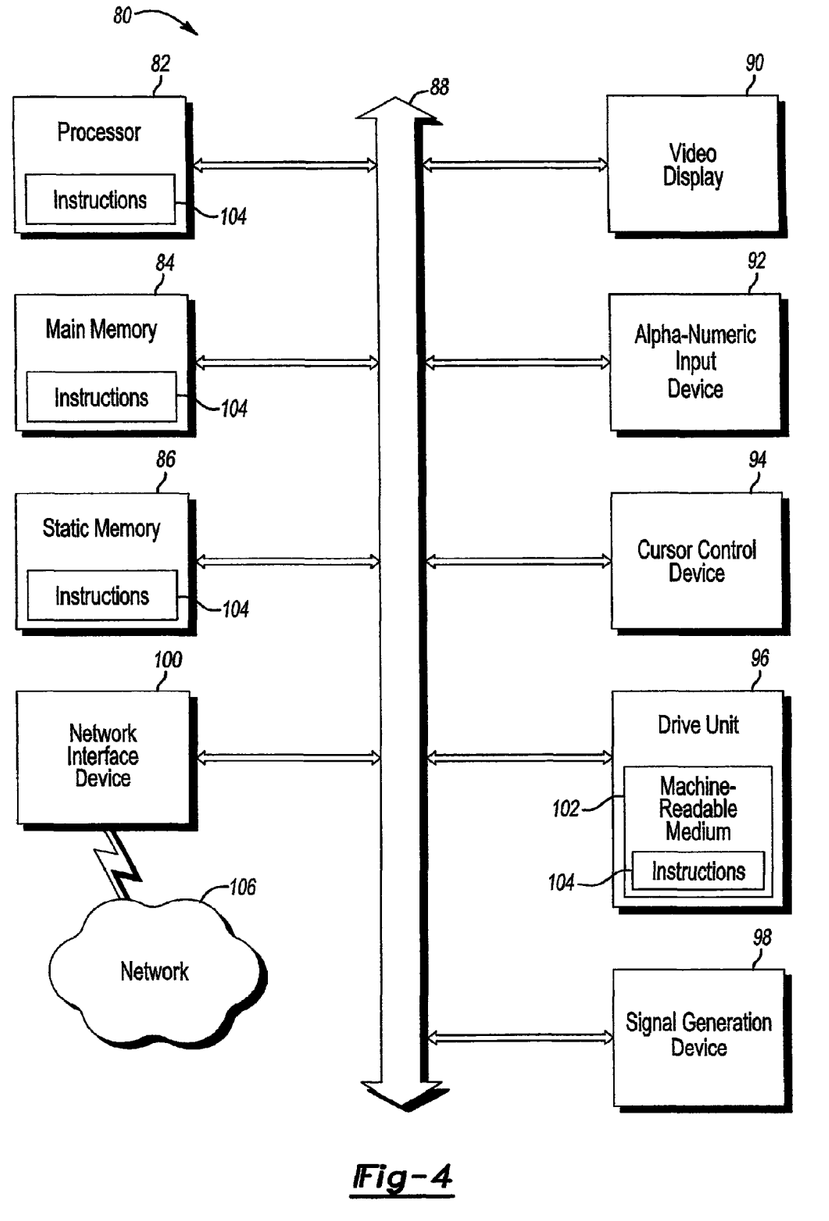
FIG. 4 is a diagrammatic representation of a machine in the form of a computer system within which a set of instructions, when executed, may cause the machine to perform any one or more of the methodologies discussed herein.

FIG. 4 is a diagrammatic representation of a machine in the form of a computer system 80 within which a set of instructions, when executed, may cause the machine to perform any one or more of the methodologies discussed herein. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment. The machine may comprise a server computer, a client user computer, a personal computer (PC), a tablet PC, a set-top box (STB), a Personal Digital Assistant (PDA), a cellular telephone, a mobile device, a palmtop computer, a laptop computer, a desktop computer, a personal digital assistant, a communications device, a wireless telephone, a land-line telephone, a control system, a camera, a scanner, a facsimile machine, a printer, a pager, a personal trusted device, a web appliance, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

Computer system 80 may include a processor 82 (e.g., a central processing unit (CPU), a graphics processing unit (GPU), or both), a main memory 84 and a static memory 86, which communicate with each other via a bus 88. The computer system 80 may further include a video display unit 90 (e.g., a liquid crystal display (LCD)), a flat panel, a solid state display, or a cathode ray tube (CRT)). Computer system 80 may include an input device 92 (e.g., a keyboard), a cursor control device 94 (e.g., a mouse), a disk drive unit 96, a signal generation device 98 (e.g., a speaker or remote control) and a network interface device 100.

Disk drive unit 96 may include a machine-readable medium 102 on which is stored one or more sets of instructions (e.g., software 104) embodying any one or more of the methodologies or functions described herein, including those methods illustrated herein above. Instructions 104 may also reside, completely or at least partially, within main memory 84, static memory 86, and/or within processor 82 during execution thereof by computer system 80. Main memory 84 and processor 82 also may constitute machine-readable media. Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but are not limited to, distributed processing or component/object distributed processing, parallel processing, or virtual machine processing can also be constructed to implement the methods described herein.

The present disclosure contemplates a machine readable medium containing instructions 104, or that which receives and executes instructions 104 from a propagated signal so that a device connected to a network environment 106 can send or receive voice, video or data, and to communicate over network 106 using instructions 104. Instructions 104 may further be transmitted or received over network 106 via network interface device 100.

While machine-readable medium 102 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure. The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and carrier wave signals such as a signal embodying computer instructions in a transmission medium; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represents examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "disclosure" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

While embodiments of the disclosure have been illustrated and described, it is not intended that these embodiments illustrate and describe all possible forms of the disclosure. Rather, the words used in the specification are words of description rather than limitation, and it is understood that various changes may be made without departing from the spirit and scope of the disclosure.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

As required, detailed embodiments of the present disclosure are disclosed herein; however, it is to be understood that the disclosed embodiments are merely exemplary of the invention that may be embodied in various and alternative forms. The figures are not necessarily to scale, some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present disclosure.

What is claimed is:

1. A system for providing a customized ringtone, the system comprising:
    a processor; and
    a memory storing instructions that, when executed by the processor, cause the processor to perform operations comprising:
        receiving information identifying a device intended to receive the customized ringtone generated from a sample recording,
        determining capabilities of the device based on the information identifying the device,
        determining a synthesizing option available to facilitate synthesizing the sample recording based on the capabilities of the device,
        providing the synthesizing option for synthesizing the sample recording,
        receiving a synthesized version of the sample recording, and
        converting the synthesized version of the sample recording to the customized ringtone.

2. The system of claim 1, wherein the memory stores further instructions that, when executed by the processor, cause the processor to perform operations comprising transmitting the customized ringtone to the device for use by the device in alerting of an incoming call.

3. The system of claim 1, wherein converting the synthesized version of the sample recording to the customized ringtone is based on the capabilities of the device.

4. The system of claim 1, wherein converting the synthesized version of the sample recording to the customized ringtone comprises manipulating the synthesized version of the sample recording from a first format to a second format to create the customized ringtone, wherein the capabilities of the device indicate that the second format is suitable for use by the device.

5. The system of claim 1, wherein the synthesizing option comprises a sound adjustment to the sample recording.

6. The system of claim 1, wherein the synthesizing option comprises a visual adjustment to the sample recording.

7. The system of claim 1, wherein the capabilities of the device comprise ringtone capabilities, application capabilities, and subscription related features.

8. A method for providing a customized ringtone, the method comprising:
    receiving, at a processor, information identifying a device intended to receive the customized ringtone generated from a sample recording;
    determining, by the processor, capabilities of the device based on the information identifying the device;
    determining, by the processor, a synthesizing option available to facilitate synthesizing the sample recording based on the capabilities of the device;
    providing, by the processor, the synthesizing option for synthesizing the sample recording;
    receiving, by the processor, a synthesized version of the sample recording; and
    converting, by the processor, the synthesized version of the sample recording to the customized ringtone.

9. The method of claim 8, further comprising transmitting the customized ringtone to the device for use by the device in alerting of an incoming call.

10. The method of claim 8, wherein converting the synthesized version of the sample recording to the customized ringtone is based on the capabilities of the device.

11. The method of claim 8, wherein converting the synthesized version of the sample recording to the customized ringtone comprises manipulating the synthesized version of the sample recording from a first format to a second format to create the customized ringtone, wherein the capabilities of the device indicate that the second format is suitable for use by the device.

12. The method of claim 8, wherein the synthesizing option comprises a sound adjustment to the sample recording.

13. The method of claim 8, wherein the synthesizing option comprises a visual adjustment to the sample recording.

14. The method of claim 8, wherein the capabilities of the device comprise ringtone capabilities, application capabilities, and subscription related features.

15. A non-transitory machine-readable storage medium storing instructions that, when executed by a processor, cause the processor to perform operations comprising:
   receiving information identifying a device intended to receive a customized ringtone generated from a sample recording;
   determining capabilities of the device based on the information identifying the device;
   determining a synthesizing option available to facilitate synthesizing the sample recording based on the capabilities of the device;
   providing the synthesizing option for synthesizing the sample recording;
   receiving a synthesized version of the sample recording; and
   converting the synthesized version of the sample recording to the customized ringtone.

16. The non-transitory machine-readable storage medium of claim 15, storing further instructions that, when executed by the processor, cause the processor to perform operations comprising transmitting the customized ringtone to the device for use by the device in alerting of an incoming call.

17. The non-transitory machine-readable storage medium of claim 15, wherein converting the synthesized version of the sample recording to the customized ringtone is based on the capabilities of the device.

18. The non-transitory machine-readable storage medium of claim 15, wherein converting the synthesized version of the sample recording to the customized ringtone comprises manipulating the synthesized version of the sample recording from a first format to a second format to create the customized ringtone, wherein the capabilities of the device indicate that the second format is suitable for use by the device.

19. The non-transitory machine-readable storage medium of claim 15, wherein the synthesizing option comprises at least one of a sound adjustment to the sample recording or a visual adjustment to the sample recording.

20. The non-transitory machine-readable storage medium of claim 15, wherein the capabilities of the device comprise ringtone capabilities, application capabilities, and subscription related features.

* * * * *